(12) United States Patent
Hsu

(10) Patent No.: US 8,584,696 B2
(45) Date of Patent: Nov. 19, 2013

(54) WATER CONTROL STRUCTURE OF FAUCET

(75) Inventor: Ming-Yuan Hsu, Changhua (TW)

(73) Assignee: Da Yuan Sheng Industrial Co. Ltd., Changhua (TW)

( * ) Notice: Subject to any disclaimer, the term of this patent is extended or adjusted under 35 U.S.C. 154(b) by 99 days.

(21) Appl. No.: 13/354,241

(22) Filed: Jan. 19, 2012

(65) Prior Publication Data

US 2013/0186489 A1 Jul. 25, 2013

(51) Int. Cl.
*F16K 5/00* (2006.01)
*F15B 13/00* (2006.01)
*E03C 1/04* (2006.01)

(52) U.S. Cl.
USPC .......................... 137/315.12; 137/891; 4/677

(58) Field of Classification Search
USPC .................... 137/315.12, 625.41, 625.4, 801; 4/675–678, 695
See application file for complete search history.

(56) References Cited

U.S. PATENT DOCUMENTS

2012/0018009 A1* 1/2012 Veros et al. ................ 137/454.2

* cited by examiner

*Primary Examiner* — John K Fristoe, Jr.
*Assistant Examiner* — Kevin Barss
(74) *Attorney, Agent, or Firm* — Che-Yang Chen; Law Office of Michael Chen

(57) ABSTRACT

A water control structure of a faucet includes a main body, a water collecting base, and a water control valve. The main body is tubular with thin body wall, having a receiving space that receives the water collecting base having water inlet holes on lower portion thereof for water inlet tubes, and each water inlet hole extends upwards to form a water inlet channel, and a water outlet channel is formed therebetween. A water outlet hole is formed on an upper portion of the water outlet channel, and the water outlet hole is provided for the water connecting tube of the water channel to plug in. A valve base is formed on sideway of the water inlet channel and the water outlet channel. The faucet includes the main body and the water collecting base respectively, so the complexity of the main body is reduced, and the manufacturing process is simplified.

3 Claims, 7 Drawing Sheets

WATER CONTROL STRUCTURE OF FAUCET

FIELD OF THE INVENTION

The present invention relates to a water control structure of a faucet, and more specifically to the faucet including a main body and a water collecting base to reduce the complexity of the main body, and further simplify the manufacturing process. Also, the structure of the main body can be simplified to a thin-wall structure to reduce material, and further reduce manufacturing costs.

BACKGROUND OF THE INVENTION

In conventional faucets, a main body thereof extends downward and is connected with a connecting tube. A valve slot of a water control valve is recessedly formed on sideway of the main body. A plurality of flow holes are formed on the opening of the valve slot, and each flow hole is provided to connect with a water inlet tube and a water outlet tube. The water outlet tube further extends from an upper portion of the main body. However, the main body is preliminarily made by copper, and the valve slot and flow holes are formed by drilling the main body, which may waste much copper material during manufacturing process. Also, the manufacturing process becomes more complicated and is easy to fail, so the manufacturing cost is high. Moreover, the main body of the faucet and the connecting portion are often made in one piece, it is difficult to assemble or disassemble. So, if the manufacturer wants to promote different types of faucets, the user has to change the entire set (including the main body and connecting portion), which is not cost-effective.

SUMMARY OF THE INVENTION

The problem to be solved in the present invention is (a) the main body is preliminarily made by copper, and the valve slot and flow holes are formed by drilling the main body, which may waste much copper material during manufacturing process. Also, the manufacturing process becomes more complicated and is easy to fail, so the manufacturing cost is high; and (b) the main body of the faucet and the connecting portion are often made in one piece, it is difficult to assemble or disassemble. So, if the manufacturer wants to promote different types of faucets, the user has to change the entire set (including the main body and connecting portion), which is not cost-effective.

To solve the problems illustrated above, the present invention provides a water control structure of a faucet, including a main body, a water collecting base, and a water control valve. The main body is tubular with thin body wall, having a receiving space with a downward opening, and a connected receiving tube extending from sideway. An engaging post is protrudingly formed on both sides of the opening of the receiving space, and a connecting body is disposed at the opening of the receiving space. A plugging slot is recessedly formed on top of the main body, and the plugging slot is connected with the receiving space with a water channel. The water channel has a connecting end at the lower portion connecting with the plugging slot, and the connecting end extends and connects with a water connecting tube. The water collecting base has a base that has a through hole on both sides. The through hole has a locking unit to lock the engaging post of the main body. Two water inlet holes are formed on the lower portion of the base for water inlet tubes. Each water inlet hole extends upwards to form a water inlet channel, and a water outlet channel is formed therebetween. A water outlet hole is formed on top of the water outlet channel, and the water outlet hole is provided for the water connecting tube of the water channel to plug in. A valve base is formed on the sideway of the water inlet channel and the water outlet channel, and two positioning holes are recessedly formed on the valve base. The valve base also has three flow holes, each of which is connected with the water inlet channel and the water outlet channel. The water control valve is disposed in the main body and attached to the valve base of the water collecting base. The water control valve has two positioning posts protrudingly formed on the engaging side thereof, and three openings. The positioning posts plug into the positioning holes of the water collecting base, and each opening is aligned with the flow holes of the water inlet channel and the water outlet channel. A valve stick is protrudingly formed outside the water control valve, and the valve stick has a handle that is used to rotate the valve stick to control the ratio of water input/output at each opening.

Comparing with conventional faucets, the present invention is advantageous because (a) the present invention provides a faucet including a main body and a water collecting base respectively, so as to reduce the complexity of the main body, and further simplify the manufacturing process. Also, the structure of the main body can be simplified to a thin-wall structure to reduce material and further reduce manufacturing costs; (b) the main body and the connecting body can be assembled/disassembled, so the user can only replace the main body when necessary without replacing the connecting body, which is more cost-effective for the user.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
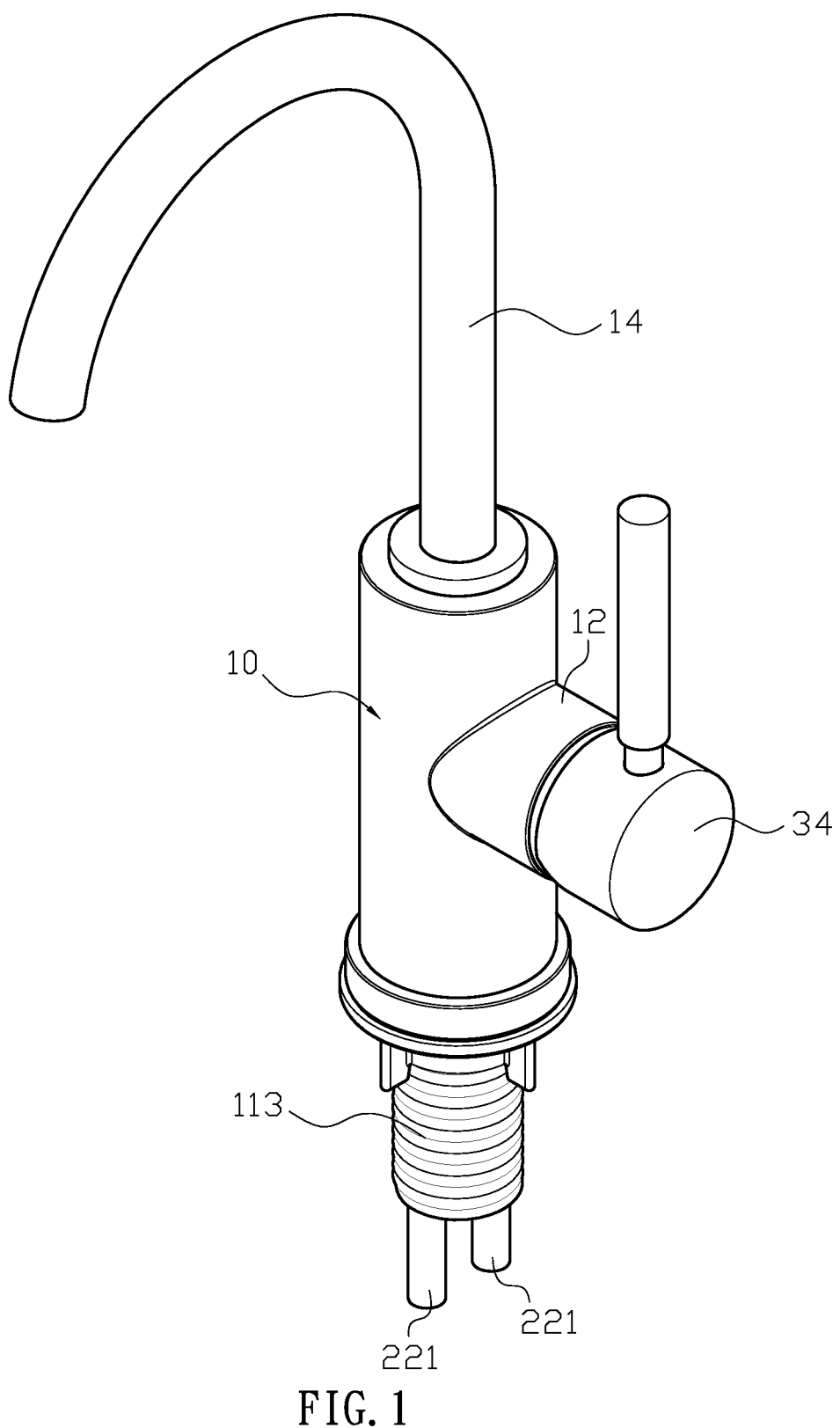
FIG. 1 illustrates a three-dimensional assembled view in the present invention.
Figure 2:
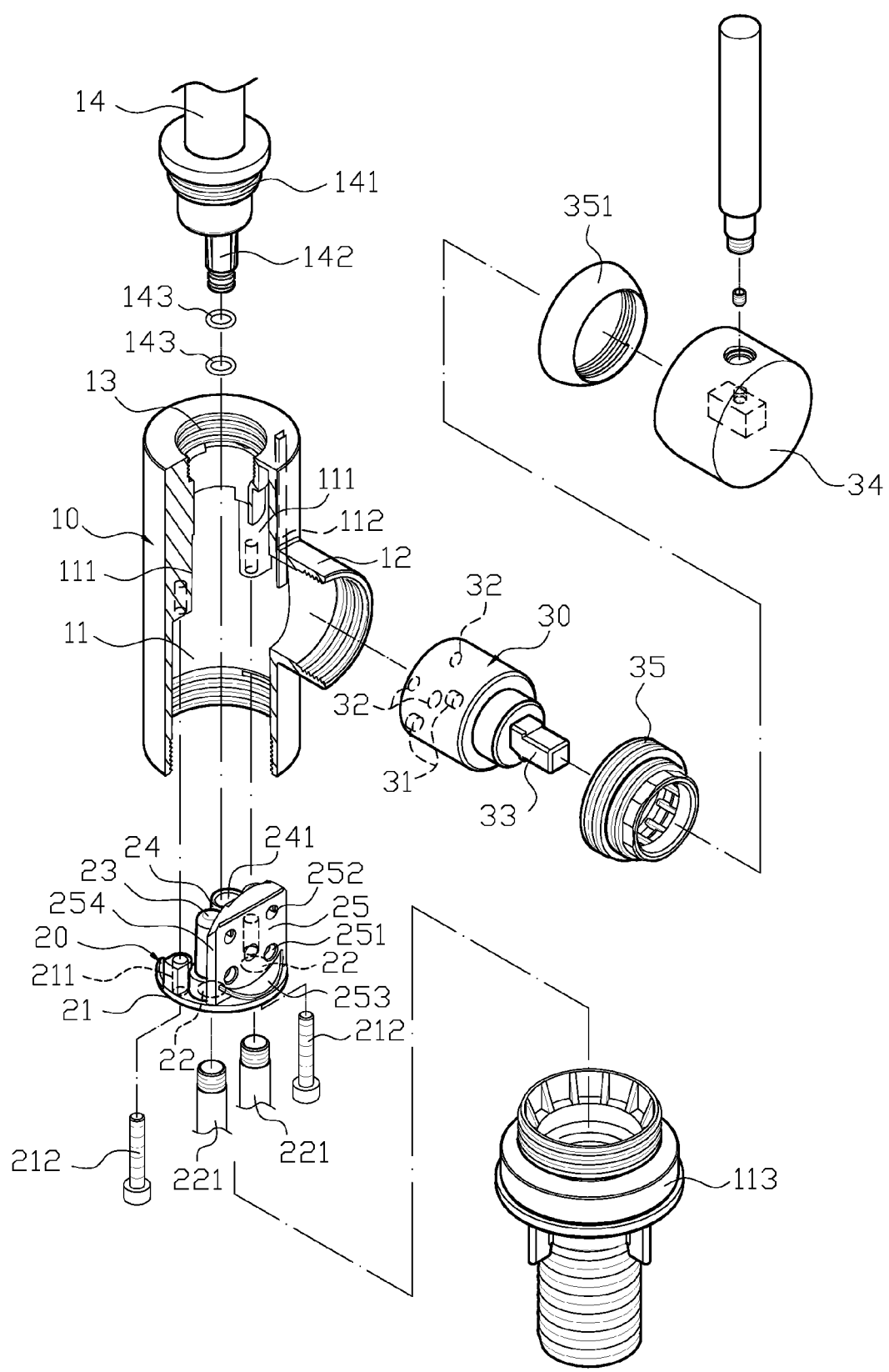
FIG. 2 illustrates a three-dimensional exploded view in the present invention.
Figure 3:
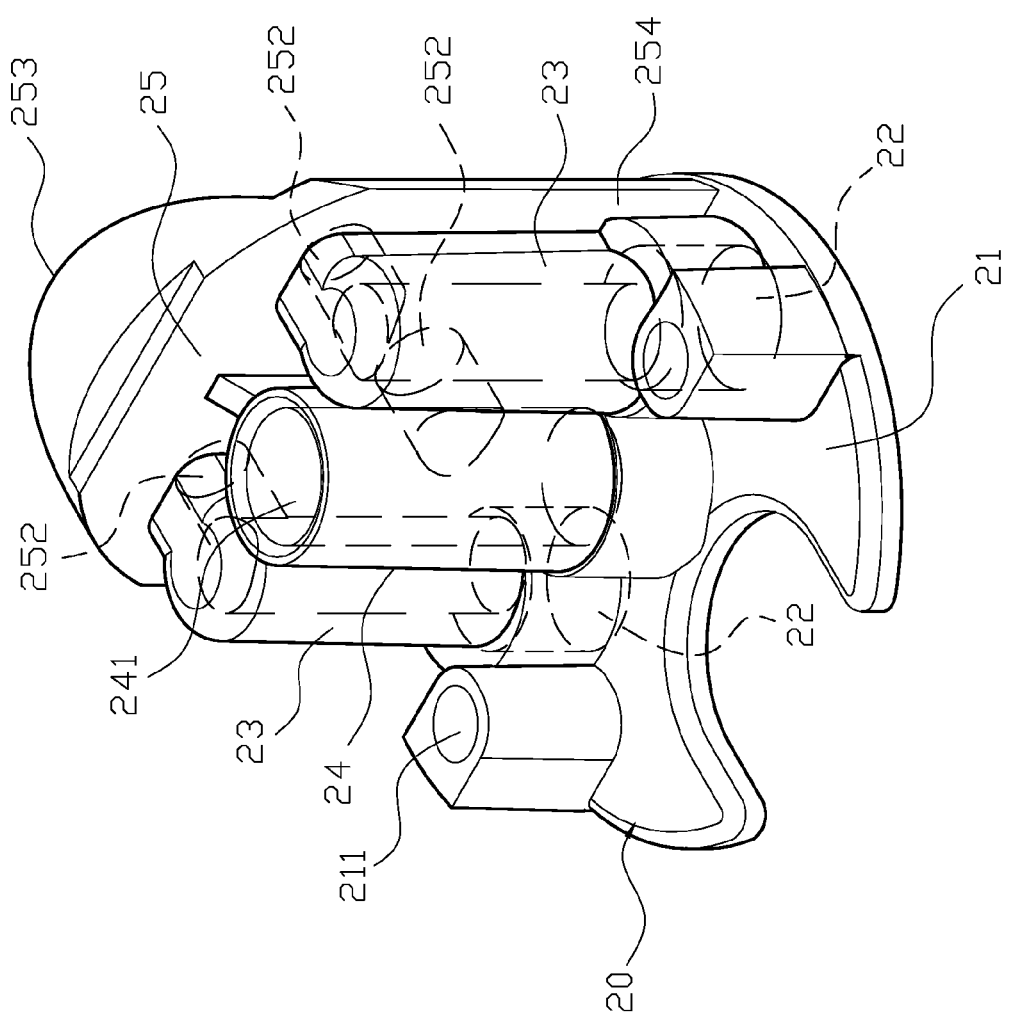
FIG. 3 illustrates a schematic view of another angle if the water collecting base in the present invention.

In order to further understand the goal, characteristics and effect of the present invention, a number of embodiments along with the drawings are illustrated as following:

Referring to FIGS. 1 to 3, a water control structure of a faucet includes a main body (10), a water collecting base (20), and a water control valve (30). The main body (10) is tubular with thin body wall, having a receiving space (11) with a downward opening, and a connected receiving tube (12) extending from sideway. An engaging post (111) is protrudingly formed on both sides of the opening of the receiving space (11), and a restricting rib (112) is protrudingly formed near the engaging post (111), and a connecting body (113) is disposed at the opening of the receiving space (11). A plugging slot (13) is recessedly formed on top of the main body (10), and the plugging slot (13) is connected with the receiving space (11) with a water channel (14). The water channel (14) has a connecting end (141) at the lower portion connecting with the plugging slot (13), and the connecting end (141) extends and connects with a water connecting tube (142). The water connecting tube (142) has a plurality of gaskets (143) disposed at the periphery thereof. The water collecting base (20) has a base (21) that has a through hole (211) on both sides. The through hole (211) has a locking unit (212) to lock the engaging post (111) of the main body (10). Two water inlet holes (22) are formed on the lower portion of the base (21) for water inlet tubes (221). Each water inlet hole (22) extends upwards to form a water inlet channel (23), and a water outlet channel (24) is formed therebetween. A water outlet hole (241) is formed on top of the water outlet channel (24), and the water outlet hole (241) is provided for the water connecting tube (142) of the water channel (14) to plug in. A valve base (25) is formed on the sideway of the water inlet channel (23) and the water outlet channel (24), and two positioning holes (251) are recessedly formed on the valve base (25). The valve base (25) also has three flow holes (252), each of which is connected with the water inlet channel (23) and the water outlet channel (24). A protruding edge (253) is each formed on an upper and lower edge of the valve base (25), and the protruding edge (253) has a restricting wing (254) on both sides against the restricting rib (112) of the main body (10) to form a restricting position. The water control valve (30) is disposed in the main body (10) and wedged at the protruding edge (253) of the water collecting base (20), so as to engage with each other and attach to the valve base (25) of the water collecting base (20). The water control valve (30) has two positioning posts (31) protrudingly formed on the engaging side thereof, and three openings (32). The positioning posts (31) plug into the positioning holes (251) of the water collecting base (20), and each opening (32) is aligned with the flow holes (252) of the water inlet channel (23) and the water outlet channel (24). A valve stick (33) is protrudingly formed outside the water control valve (30), and the valve stick (33) has a handle (34) that is used to rotate the valve stick (33) to control the ratio of water input/output at each opening (32). A restricting ring (35) is formed at an outer periphery of the valve stick (33), and the restricting ring (35) is locked at an opening edge of the receiving tube (12) of the main body (10), so that the water control valve (30) forms a restricting position. Also, a decorative cover (351) is disposed outside the restricting ring (35).

Figure 4:
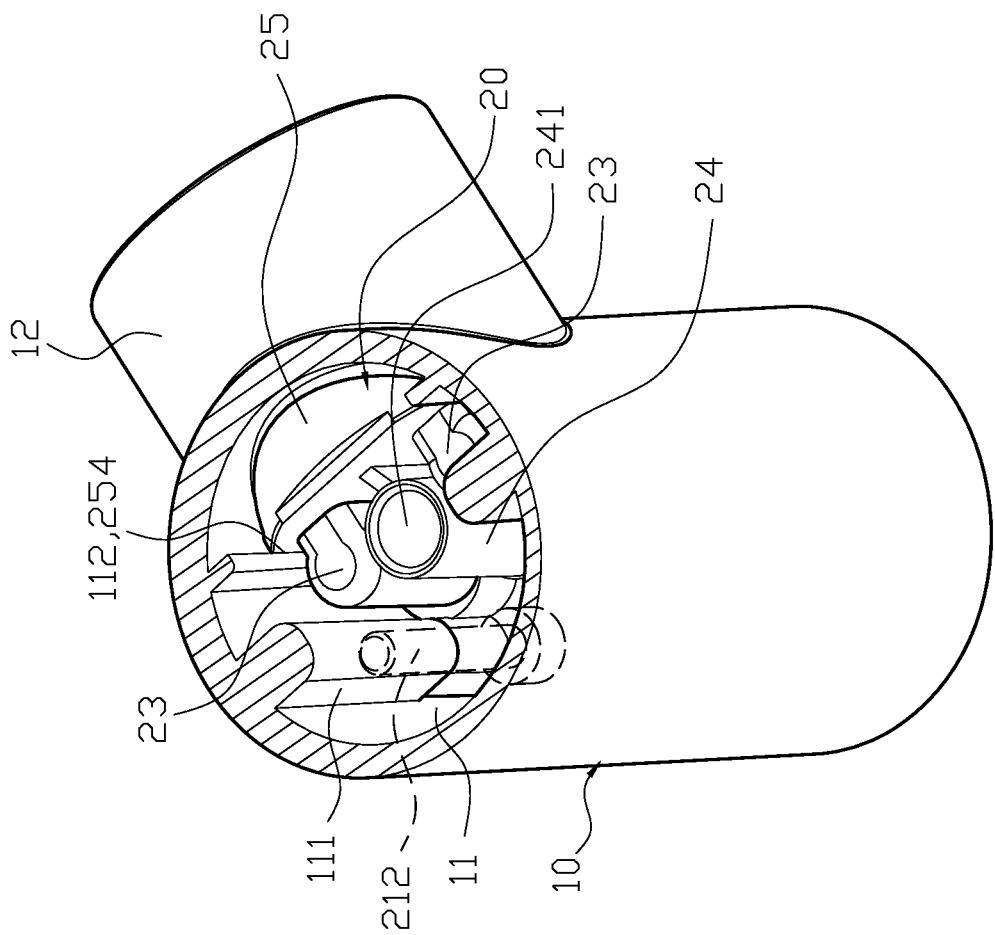
FIG. 4 illustrates a three-dimensional sectional view in the present invention.
Figure 5:
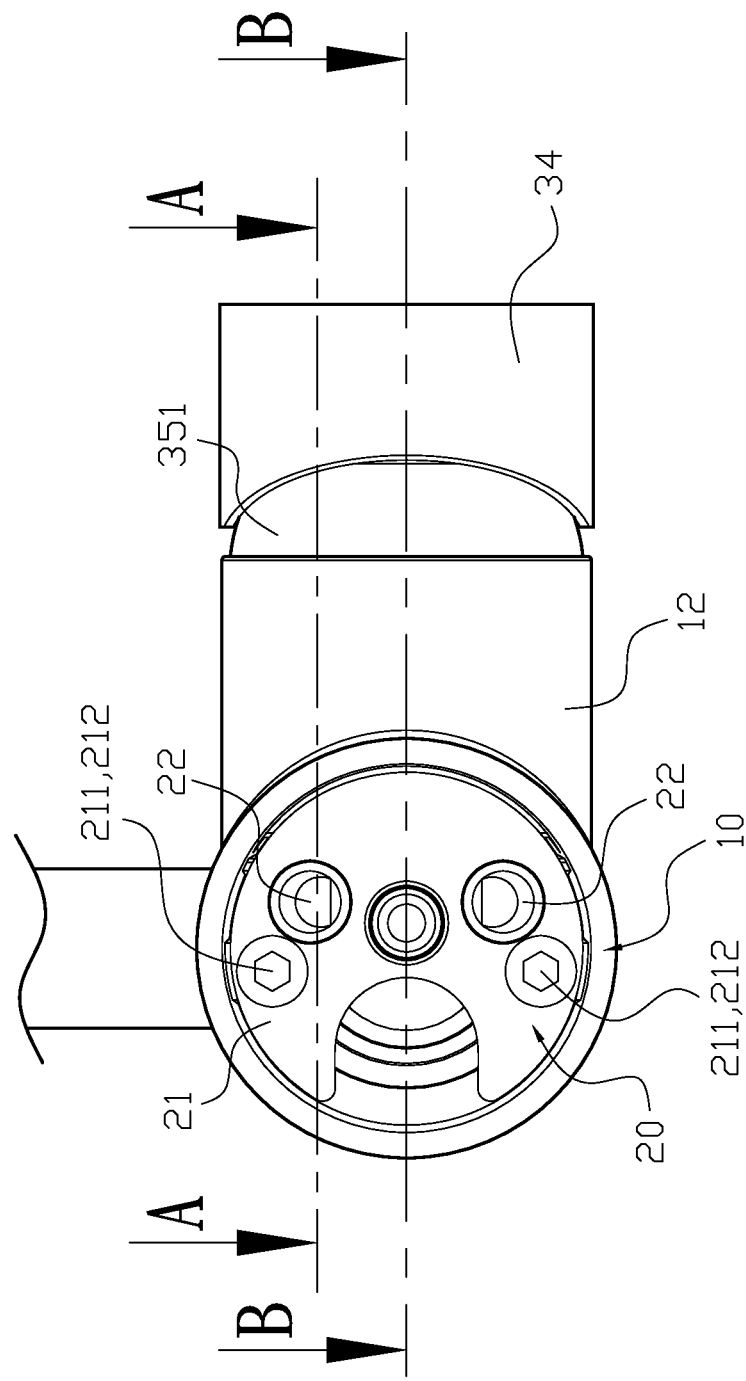
FIG. 5 illustrates a schematic sectional view in the present invention.

Referring to FIGS. 2, 4 and 5 for the structure, the water inlet tubes (221) are connected with the water inlet holes (22), and the water collecting base (20) is disposed into the receiving space (11) of the main body (10). At this time, since the water collecting base (20) has two restricting wings (254) on both sides, it can slide along the restricting rib (112) of the main body (10), so that the through hole (211) of the water collecting base (20) can align with the engaging post (111) of the main body (10) to form a preliminary positioning (see FIG. 4 as well). Furthermore, the locking unit (212) can be passed through to form a secure positioning to achieve the goal of easy installation and assembly. The water channel (14) is connected to the plugging slot (13) of the main body (10), and the water connecting tube (142) plugs into the water outlet hole (241) of the water collecting base (20). Also, the water control valve (30) is disposed into the receiving tube (12) of the main body (10), and the positioning posts (31) plug into the positioning holes (251) of the water collecting base (20), so that each opening (32) is aligned with the flow holes (252) of the water inlet channel (23) and the water outlet channel (24). Next, the restricting ring (35) is locked at the opening edge of the receiving tube (12) of the main body (10), so that the water control valve (30) forms a restricting position to complete the assembly process. In the present invention, a faucet includes a main body (10) and a water collecting base (20) to reduce the complexity of the main body (10), and further simplify the manufacturing process. Also, the structure of the main body (10) can be simplified to a thin-wall structure to reduce material and further reduce manufacturing costs. On the other hand, since the main body (10) and the connecting body (113) can be assembled/disassembled, the user can only replace the main body (10) when necessary without replacing the connecting body (113), which is more cost-effective for the user.

Figure 6:
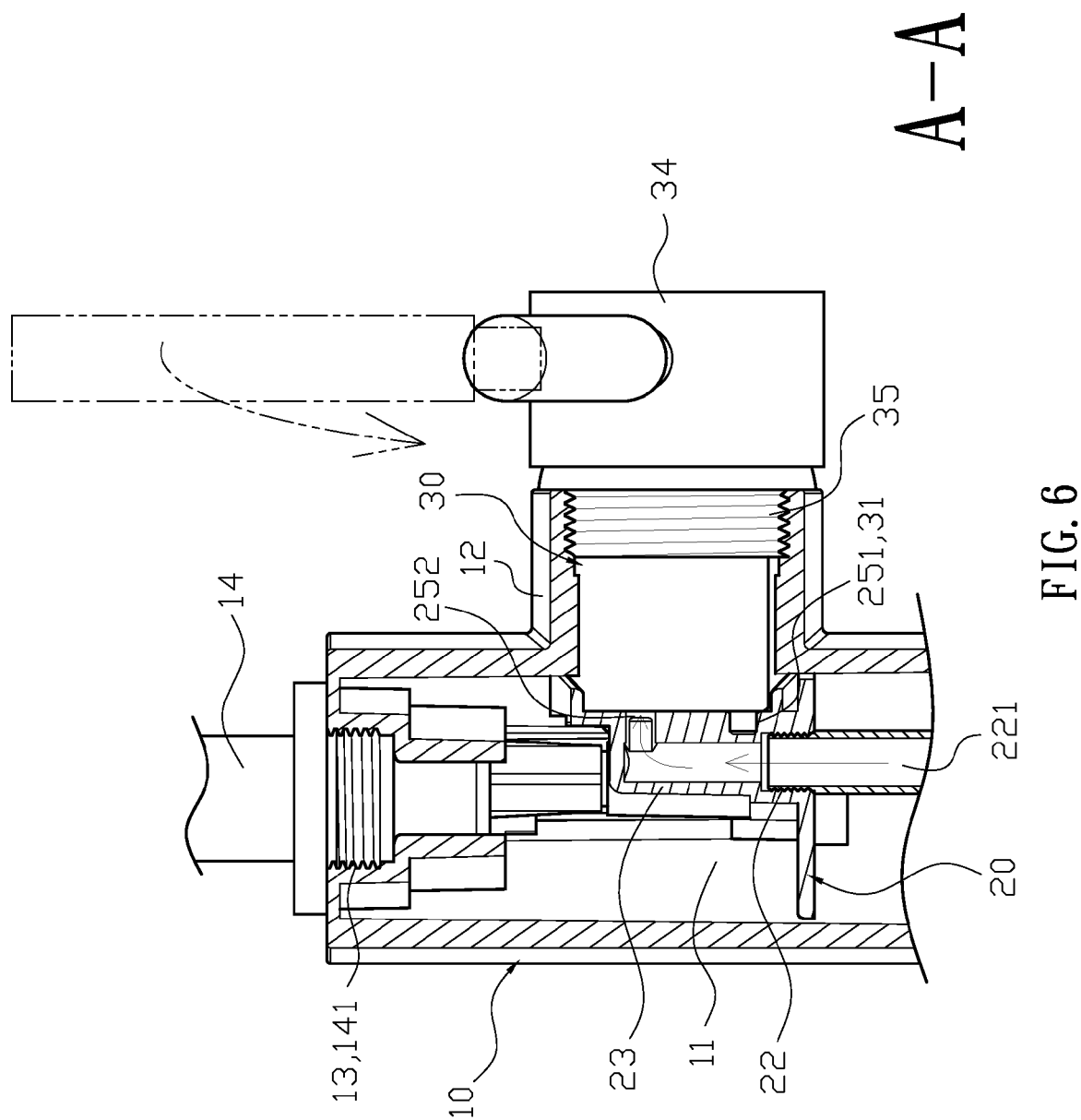
FIG. 6 illustrates a schematic sectional view in FIG. 5 along line A-A in the present invention.
Figure 7:
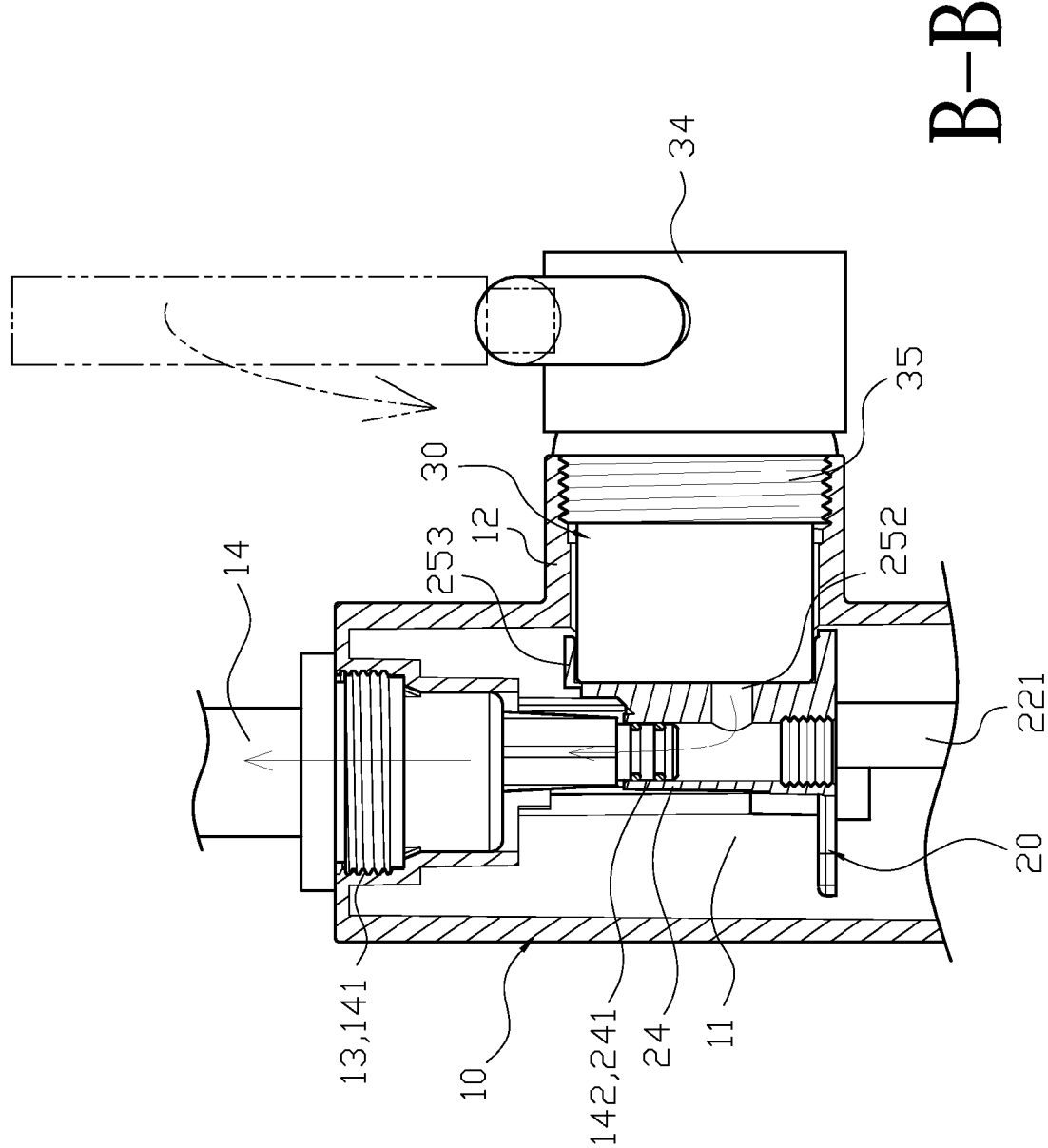
FIG. 7 illustrates a schematic sectional view in FIG. 5 along line B-B in the present invention.

Referring to FIGS. 2, 6 and 7 for practical use of the present invention, the main body (10) is connected with the connecting body (113), and the water inlet tubes (221) of the water collecting base (20) is connected to the water source. When the user rotates the handle (34) to drive the valve stick (33) of the water control valve (30), the water flows from the water inlet holes (22) of the water collecting base (20) and the water inlet channel (23) to the openings (32) of the water control valve (30). The water then flows from the water control valve (30), the flow holes (252) of the water outlet channel (24) and the water outlet hole (241) to the water channel (14) to output the water.

According to the embodiments discussed above, the present invention has the following advantages: (a) a faucet includes a main body (10) and a water collecting base (20) respectively, so as to reduce the complexity of the main body (10), and further simplify the manufacturing process. Also, the structure of the main body (10) can be simplified to a thin-wall structure to reduce material and further reduce manufacturing costs; (b) since the main body (10) and the connecting body (113) can be assembled/disassembled, the user can only replace the main body (10) when necessary without replacing the connecting body (113), which is more cost-effective for the user; and (c) since the water collecting base (20) has two restricting wings (254) on both sides, it can slide along the restricting rib (112) of the main body (10), so that the through hole (211) of the water collecting base (20) can align with the engaging post (111) of the main body (10) to form a preliminary positioning. Furthermore, the locking unit (212) can be passed through to form a secure positioning to achieve the goal of easy installation and assembly.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A water control structure of a faucet, comprising:
a main body, which is tubular with thin body wall, having a receiving space with a downward opening, and a connected receiving tube extending from sideway, wherein an engaging post is protrudingly formed on both sides of an opening of the receiving space, and a connecting body is disposed at the opening of the receiving space, wherein a plugging slot is recessedly formed on top of the main body, and the plugging slot is connected with the receiving space with a water channel that has a connecting end at the lower portion connecting with the plugging slot, and the connecting end extends and connects with a water connecting tube,
a water collecting base, having a base that has a through hole on both sides, and the through hole has a locking unit to lock the engaging post of the main body, wherein two water inlet holes are formed on the lower portion of the base for water inlet tubes, and each water inlet hole extends upwards to form a water inlet channel, and a water outlet channel is formed therebetween, wherein a water outlet hole is formed on top of the water outlet channel, and the water outlet hole is provided for the water connecting tube of the water channel to plug in, wherein a valve base is formed on the sideway of the water inlet channel and the water outlet channel, and two positioning holes are recessedly formed on the valve base, while three flow holes are disposed thereon, each of which is connected with the water inlet channel and the water outlet channel; and
a water control valve, disposed in the receiving tube of the main body and attached to the valve base of the water collecting base, having two positioning posts protrudingly formed on one side thereof, and three openings, wherein the positioning posts plug into the positioning holes of the water collecting base, and each opening is aligned with the flow holes of the water inlet channel and the water outlet channel, wherein a valve stick is protrudingly formed outside the water control valve, and the valve stick has a handle that is used to rotate the valve stick to control the ratio of water input/output at each opening,
wherein a restricting rib is protrudingly formed near the engaging post, and a restricting wing is formed on both sides of the valve base of the water collecting base, and the restricting wing is able to slide along the restricting rib of the main body, so that the through hole of the water collecting base is able to align with the engaging post of the main body to form a preliminary positioning.

2. The water control valve of a faucet of claim 1, wherein a protruding edge is each formed on an upper and lower edge of the valve base, and the water control valve is wedged at the protruding edge of the water collecting base, so as to engage with each other and attach to the valve base of the water collecting base.

3. The water control valve of a faucet of claim 1, wherein the valve stick of the water control valve has a handle, and a restricting ring covered by a decorative cover is provided outside the valve stick, and the restricting ring is locked at an opening edge of the receiving tube of the main body, so that the water control valve forms a restricting position.

* * * * *